W. A. HENDRYX.
ELECTROLYTIC APPARATUS FOR RECOVERING METALS FROM SOLUTIONS.
APPLICATION FILED APR. 23, 1906.
949,016.
Patented Feb. 15, 1910.
4 SHEETS—SHEET 3.
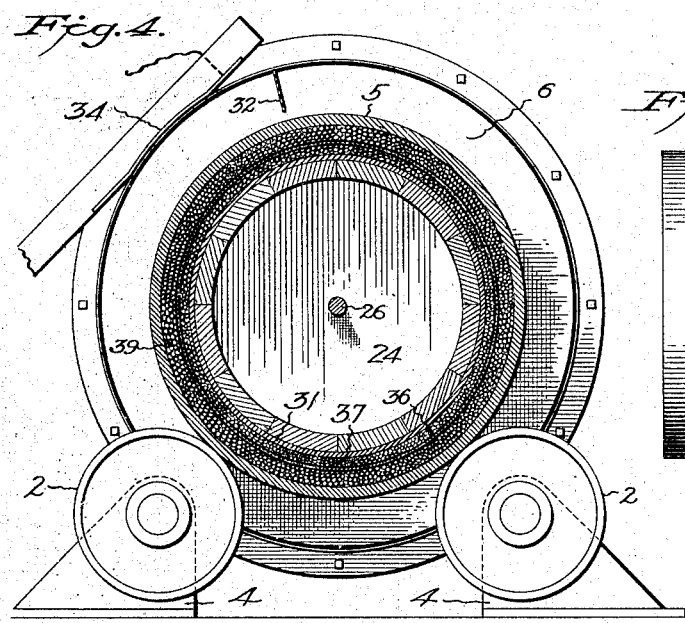
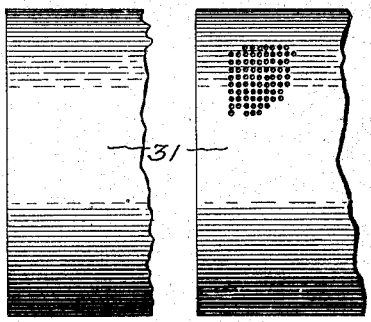
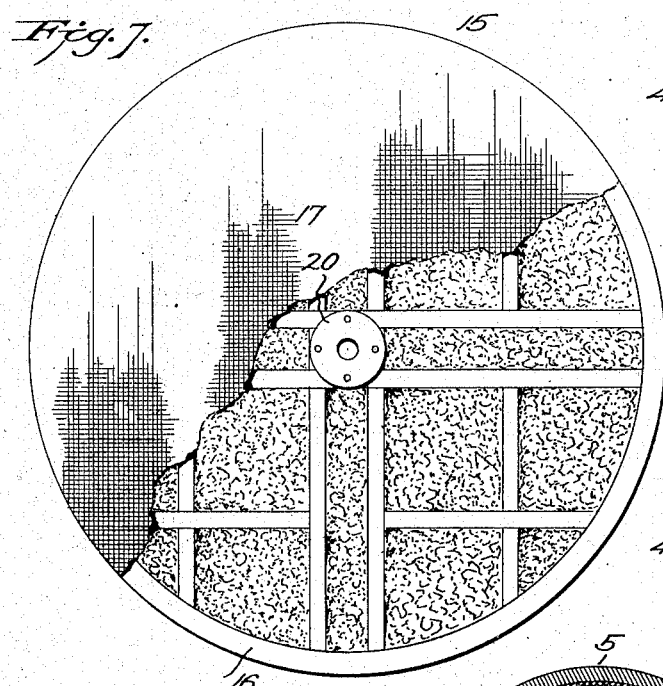
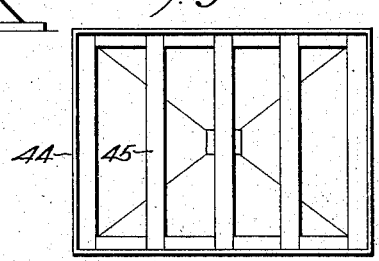
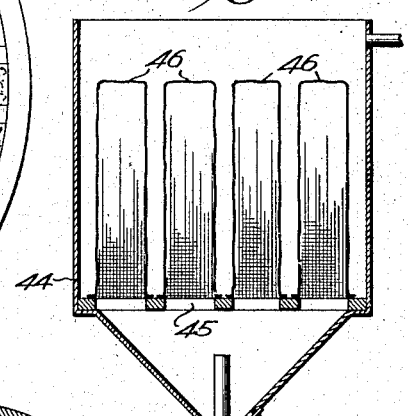
Witnesses:
G. Sargent Elliott.
Adella M. Fowle
Inventor:
By Wilbur A. Hendryx.
H. S. Bailey. Attorney.

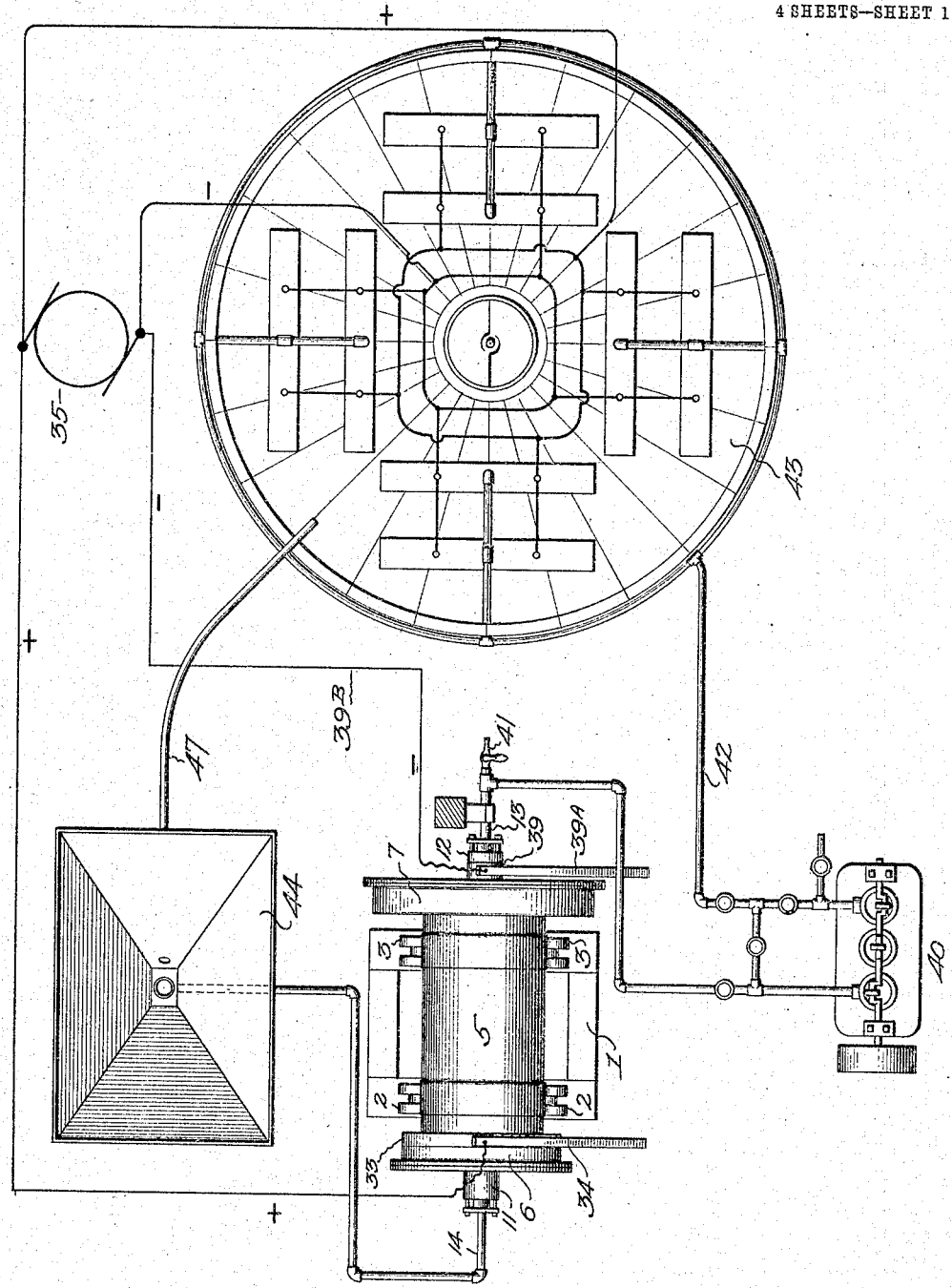

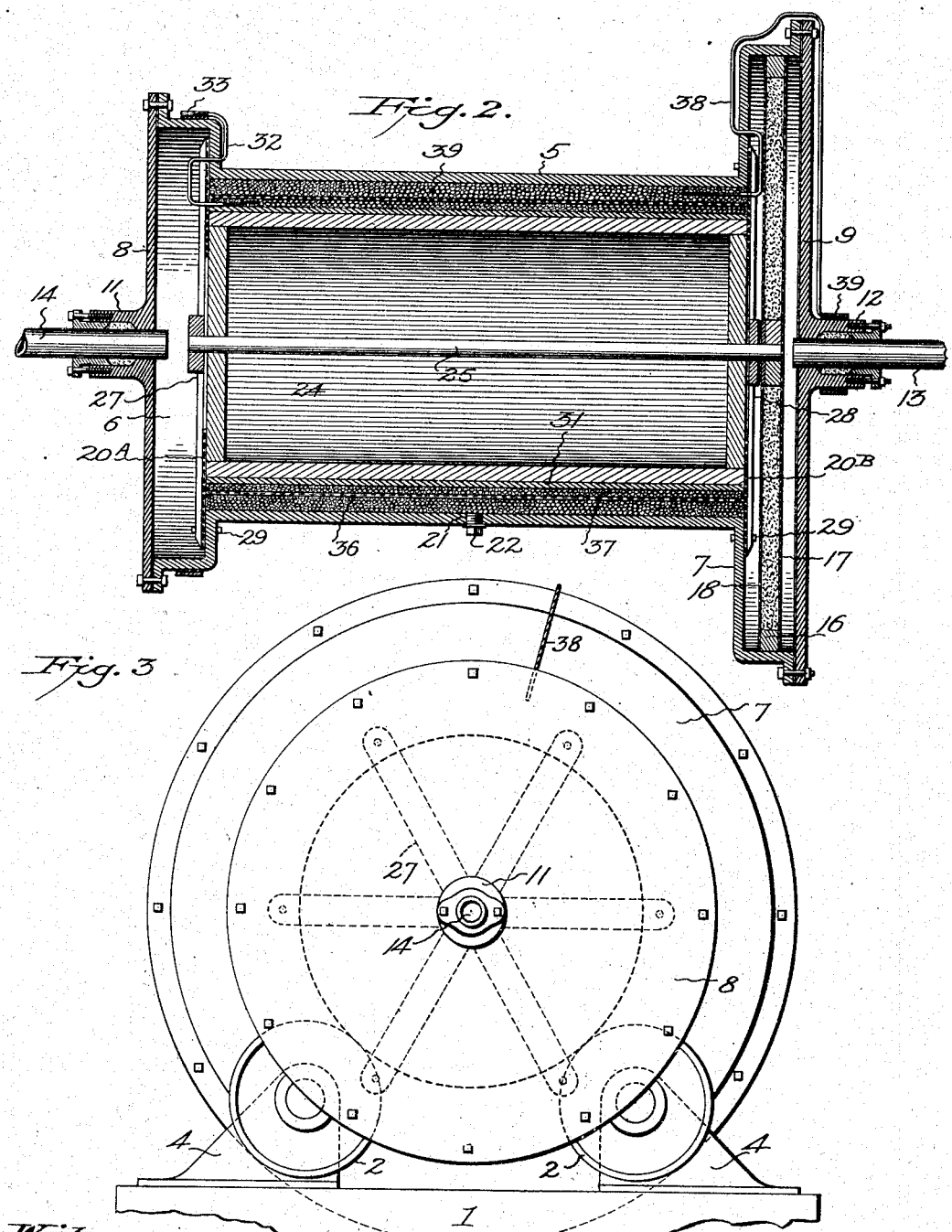

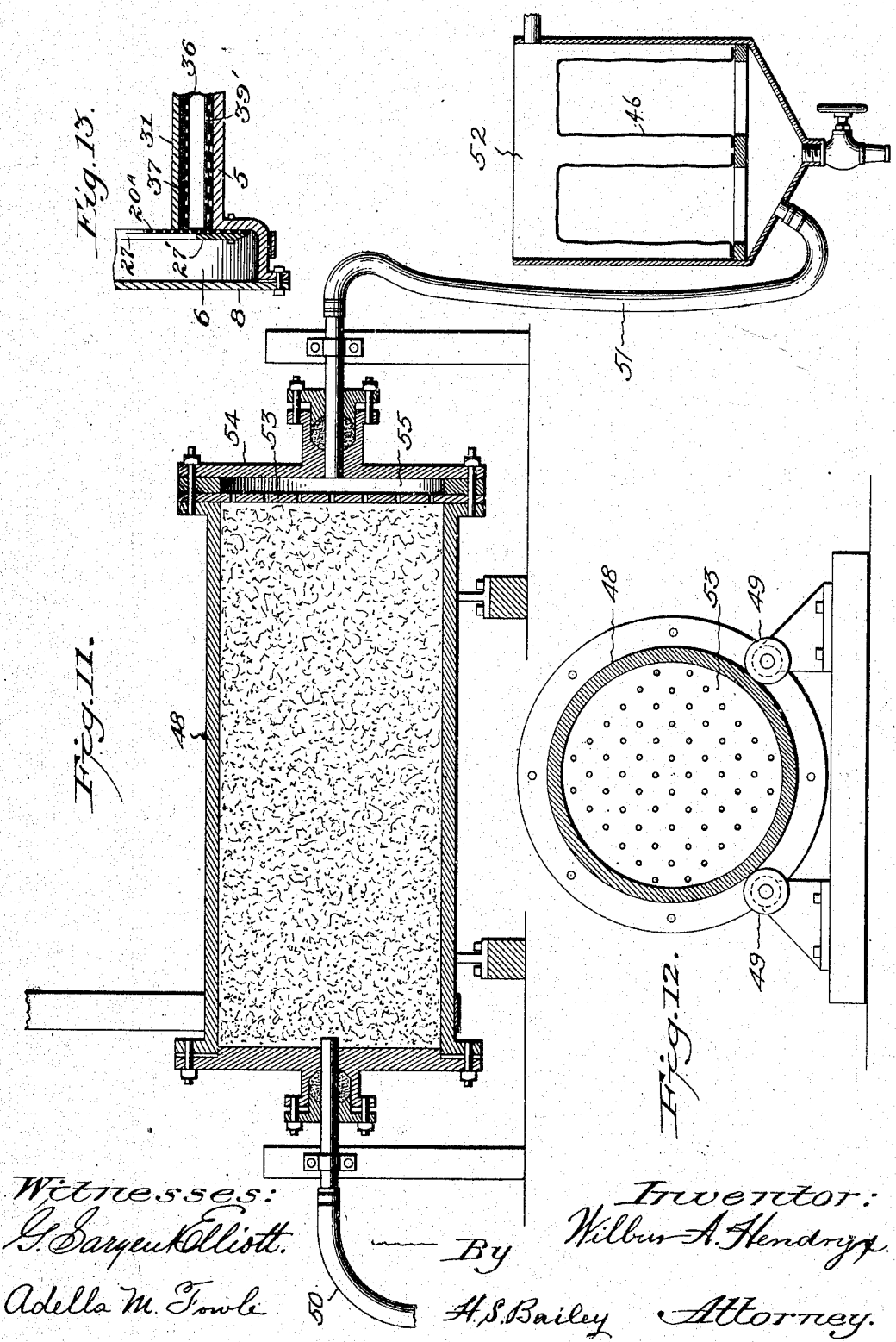

UNITED STATES PATENT OFFICE.

WILBUR ALSON HENDRYX, OF DENVER, COLORADO.

ELECTROLYTIC APPARATUS FOR RECOVERING METALS FROM SOLUTIONS.

949,016. Specification of Letters Patent. Patented Feb. 15, 1910.

Application filed April 23, 1906. Serial No. 313,257.

*To all whom it may concern:*

Be it known that I, WILBUR A. HENDRYX, a citizen of the United States of America, residing in the city and county of Denver and State of Colorado, have invented a new and useful Electrolytic Apparatus for Recovering Metals from Solutions, of which the following is a specification.

My invention relates to a new and improved type of electrolytic precipitating apparatus for the recovery of gold, silver, copper, and other metallic values from cyanid and other chemical ore pulp solutions.

The objects of my invention are: First, to provide a new precipitating electro-chemical device that embodies an enormous multiplicity of metal depositing surfaces. Second, to provide a new filtering and electro-chemical precipitating device that contains a great multiplicity of electrical deposition cathode surfaces. Third, to provide a revoluble electro-chemical metal deposition device, having a great multiplicity of self cleaning metal depositing cathodes. Fourth, to provide a revoluble filtering and electro-chemical metal depositing device, having a great multiplicity of anode surfaces, and a great multiplicity of metal depositing cathode surfaces. Sixth, to provide a new electro-chemical metal depositing revoluble filter in which a great multiplicity of movable anodes and self-cleaning revoluble cathodes are employed, that are adapted to receive the depositions of metal from the chemical solutions, and that can be adapted to automatically free themselves from the deposited metal. Seventh, to provide a simple, inexpensive, electro-chemical deposition revoluble filtering device of great capacity. Eighth, to provide a new and improved filtering process for electro-chemical metallic ore-pulp solutions, which consists of circulating said solutions by means of a suitable pump from a solution supply tank through a revoluble electrode and then through a fixed filter and back to the tank again. Ninth, to provide a new and improved method of depositing metals, which consists of circulating through the medium of a suitable pump or other methods, chemical ore pulp solution first through a revolving electrolytic electrode, comprising a revolving anode, of any suitable material, and a cathode of any suitable material, preferably in a granulated pulverulent form, and containing a filtering medium arranged and adapted to filter the ore-pulp solutions before they flow to the anodes and cathodes, and then circulating the solutions through a fixed filtering device provided with filtering mediums arranged to catch any metallic values that separate from the cathodes and flow with the solutions from the revoluble electrolytic electrode to the stationary filter, and then returning the solution to said supply tank and continuously circulating it through said depositing apparatus until a satisfactory percentage of its values have been electrolytically recovered. And tenth, to provide a new system of electrolytically recovering the metallic values from chemical ore-pulp solutions, which consists of circulating them through a revolving depositing device containing an anode, comprising a mass of granulated material, adapted to give an enormous multiplicity of anode surfaces of any suitable character, such as lead shot, and containing a cathode comprising a mass of suitable material adapted to give a great multiplicity of cathode surfaces, such as lead shot that are adapted to electrolytically receive and retain in an easily recoverable manner the metallic values depositing on their surfaces, and that will permit the values deposited on them to separate from them or be retained by them as either a high or low current is used, and then be washed from them by the onward flowing solutions, and then circulating said solution through a fixed filtering device provided with filtering mediums arranged and adapted to catch the metallic values that have separated from the shot cathodes and flowed to them in the solution, and then returning said solution to the solution supply tank to be recirculated or to be reused with fresh supplies of ore-pulp.

I attain these objects by the mechanism illustrated in the accompanying drawings, in which:

Figure 1, is a plan view of my improved filtering and electrolytic apparatus for recovering the precious metals from cyanid and other ore pulp solutions. Fig. 2, is a longitudinal, sectional view through the improved revoluble, filtering, electrolytic cell. Fig. 3, is an end view thereof. Fig. 4, is a transverse, sectional view through the same. Fig. 5, is a view of a portion of a cylindrical, imperforate, sheet lead anode. Fig. 6, is a similar view, showing the surface of the anode provided with a multiplicity of small perforations. Fig. 7, is a front view of the filter, which is situated in the receiving end of the revolving cell, a portion of the screen being removed. Fig. 8, is a plan view of a filtering tank used in connection with the improved revolving cell. Fig. 9, is a vertical, sectional view thereof. Fig. 10, is a sectional view of a fragment of the precipitator showing a sheet lead anode and a cathode composed of shot, which are in direct contact with the anode, the canvas sack and anode shot being dispensed with. Fig. 11, is a view of a revoluble precipitator, similar to that shown in Figs. 1 and 2, but in which the anode and cathode are dispensed with, the receptacle or barrel being filled with a suitable precipitating medium. Fig. 12, is a transverse sectional view of the same. Fig. 13 is a fragmentary section of a modification.

Similar characters of reference refer to similar parts throughout the several views.

Referring to the drawings, the numeral 1, designates supporting timbers, upon which are mounted four pairs of rollers, 2 and 3, said rollers being journaled upon supporting castings 4, and positioned to rotatably support a cylindrical drum 5, which carries at its ends enlarged hollow flanges 6 and 7, to which are removably bolted heads 8 and 9, that are provided with stuffing boxes 11 and 12, to which are attached an inlet solution pipe 13, and an outlet solution pipe 14. Within the head 7, I secure a filter 15, positioning it across the entrance to the drum. This filter preferably consists of a ring of wood 16, the outside of which is covered by a disk of canvas, or asbestos, or felt, or of any other filtering material or substance 17, while the inside face of the ring is covered with a fine filtering screen 18. The screen ring is held in place in the hollow flange chamber by calking or packing its peripheral edge all around the surface of the flange chamber with hemp or asbestos or any other suitable solution tight material, and the space between the filtering cloth and screen is filled with mineral wool or any other suitable filtering medium. The ring is provided with either spokes or bars, which prevent the collapse of the screens, and these spokes or bars support a central hub 20, the object of which will be hereinafter explained. I preferably use the filter in the solution entering end of the revoluble filtering device, and in the outlet flange 6, I preferably use a screen 20$^A$ only, although if desired a filter can be used also with the screen, at the discharge end. The drum 5, is provided with an inlet aperture 21, which I preferably place centrally of its length. This aperture is threaded and a plug 22, is threaded to it. Within the drum between the screens, I place an anode, which consists of any suitably shaped member that is somewhat smaller than the interior of the drum, and may be made of any suitable material, but which I preferably construct in the following manner: I make a spool 24, preferably of wood, although any other suitable material may be used if desired. Through the axial center of the spool I place a rod 25, the ends of which project beyond the spool to form trunnions. These trunnions fit into apertures formed in spiders 27 and 28, which are placed across the ends of the drum, and lap over onto the surface of the end flanges, and are secured to them by bolts 29. These trunnions and the spiders thus centralize the anode spool in the axial center of the drum. The trunnion at the entrance end of the drum extends through the hub 20, of the filter 15, which forms the main support for the spool at this end, and the spiders also serve to clamp the screen 20$^A$ at the discharge end of the drum, and a similar screen 10$^B$ at the entrance end thereof. These screens 20$^A$ and 20$^B$ cover the space between the drum 5 and the spool 24. Around the core of the spool, I wrap a sheet of lead 31, which may be either imperforate or provided with a multiplicity of perforations, and to it I connect one end of an electric wire 32, which extends through the spider and through an aperture in the back of the end flange 6, and is connected to a commutator 33, which comprises a band of copper secured around the inner edge of the peripheral surface flange 6, and an electrode brush 34, is operatively arranged in bearing contact with the commutator ring.

The commutator is suitably insulated from the flange 6, and the electrode brush is connected to an electric wire, which is connected to the positive pole of a suitable electrical current generator 35. Around the lead sheet 31, I wrap loosely a filtering medium 36, of any suitable character, preferably using canvas. The space around the lead covered core and between it and the canvas is filled with any suitable granulated anode electrode material, such as granulated lead, carbon, or other suitable substances. I preferably use, however, for this purpose hard or chilled fine lead shot 37, for the reason that the fine round shot provide greater surface area than any other form or shape of material I could use. If desired, however, the lead shot and filtering medium may be dispensed with, and only the sheet or some other suitable anode material, be used. The space in the drum around the anode and between the drum and the canvas covering of the anode frame, is filled with fine soft lead shot 39; in contradistinction to the hard or chilled shot of the anode, these soft lead shot act as cathodes, and they present to the solution collectively a very large cathode surface. In fact, I employ small shot for the express purpose of securing an enormous cathode surface in a very small space. An electric current wire 38, is secured to the inside of the drum in position to contact with the cathode shot, and it is conveyed through the back of the flange 7, and is connected to a copper commutator ring 39, that is secured around the drum close to the flange, and a commutator brush 39$^A$, is operatively arranged in electrical contact with the commutator, and is connected by a wire 39$^B$ to the negative pole of a generator. I preferably use for the anode an alloyed shot known as chilled shot, as under the conditions in which I use them they are nearly insoluble in the electro-chemical solutions I employ. The soft lead shot which I preferably use for a cathode is also an alloyed metal, and is also practically insoluble; when used as a cathode in the electro-chemical solutions I employ, the deposited metals will not stick to them. When a high current density is used, the metals when deposited other than as a reguline metal will, owing to the motion of the shot as the drum rotates, break off from the shot and be carried or washed out of the deposition cell through the screen 20$^A$ (when a screen alone is used at the discharge end of the drum) by the solutions. The inlet pipe extends from the end of the stuffing box of the solution end of the revolving electrolytic filter to a force pump 40, a valve 41, being inserted in it close to the stuffing box in a position to draw samples of the solution whenever desired as it flows into the electrolytic depositor or cell. From the pump 40, a pipe 42, extends to my ore treating apparatus tank 43, which is fully described in my patent dated March 21, 1901, No. 785,214, and in my pending application No. 267785 filed June 30 1905. This agitating tank is one of the sources of the supply of the solutions for my electrolytic depositing process, method, and system. The solution discharge pipe 14, of the discharge end of the filter, is connected to the bottom of a stationary filter 44. This filter comprises a filter frame of any suitable form, having a conical bottom in which close to its lower apex I place a draw-off valve 44'. I preferably use a rectangular shaped filter, having a rectangular shaped bottom terminating in a small inlet aperture at its lower apex, to which the pipe 14, is attached. Across this tank at the junction of the conical bottom with the straight part, I place a lattice frame 45, to the top of which I secure a plurality of filtering sacks 46, which may be of any suitable material, placing them with their open ends downward and securing the edges of their open ends down to the slats in such a manner that the mouth of each sack will register with the open spaces between the slats. These sacks may be provided with any suitable precipitating material, compounds, or agent, such as zinc shavings, or iron, as illustrated in my application above referred to, and in applications Nos. 296565 and 296566, both of which were filed January 17, 1906, for "Precipitating cell" and "Apparatus for recovering metals." Consequently the solution that flows into this tank out of the revolving depositor flows up through the slots of this latticed frame into the filtering sacks, and through them and out of the top of the tank through a pipe 47, which is connected at one end thereto, and which extends to and discharges into the agitating tank, (if desired, one large filtering sack may be used in the stationary tank in place of a number of sacks, as shown,) in case it is desired to work the solutions over and over again, or it may be run into a separate tank for reuse with new solutions, or run to waste as desired. It is my practice to reuse this solution with new solution in the agitating tank, with fresh charges of ore. If desired, however, the solutions can be run from the agitating tank into a separate tank, which I do not show, by gravity, and this tank can be connected to the pump and to the fixed filter, and the solutions circulated through the revoluble and fixed filters and the tank and pump as long as desired.

The operation is as follows: The agitating tank receives a charge of a number of tons of ore, and of one or two times the bulk of cyanid or other gold dissolving solution as the ore, and within the tank are placed a group of electrolytic electrodes, which are operatively connected to a low tension current generator. The solution and ore pulp are agitated, and a large percentage of the gold and silver values of the ore is deposited on the electrodes. The solution, however, generally retains a few per cent. of the values, and it is the largest proportion of the values that I have designed my revolving electrolytic precipitating and filtering apparatus to recover. Consequently, during the operation of the agitator the solution is drawn by vacuum to the pump, and by the pump is forced into and through the revolving depositor. This depositor is operatively connected to a source of rotative power, preferably by placing a belt around the peripheral surface of one of the flanges, and is kept rotating during the time the pump is kept in action. When the solution first enters the electrolytic depositor, it encounters the filter disk, and all finely pulverized ore that may be carried from the tank through the pump to the filter is arrested, and only clear solution flows through this filter. The solution next flows through the screen, which is fine enough to hold the fine shot in the drum. The solution then flows through the fine shot that composes the cathode and also the anode when shot are used for the anode, and as the depositor is continuously rotated the shot move and rub against each other, and each shot forms an independent cathode surface by itself, but as enough shot are placed in the drum to fill it full around the anode, the current flows freely from one to the other, and permeates the mass, and the electrolytic action between the anode and the shot cathode deposits the gold and silver on the cathode shot, but owing to the nature of the solutions, all the metals do not as a rule stick or adhere to them, as a reguline metal, particularly when high currents are carried, as in a very large portion of the ores treated the values are deposited as a soft precipitate or a soft oxid, that easily detaches from the shot as they rub and roll together, and this deposit is worked through the shot by the onward flowing solution, and is carried through the shot holding screen and pipe 14, into the fixed filter, where the solutions enter the mouths of the filter sacks and flow up through them, while the gold and silver deposit that escapes from the lead shot cathodes is caught by the filtering sacks or by their contents, as when desired these sacks may be filled with zinc shavings or with any suitable material compound adapted to arrest and collect the precious metals. The solution then flows from the top of the fixed filter tank through the pipe to the agitating tank, and is recirculated with the contents of the agitating tank as long as desired. A certain amount of the gold and silver values of the ore pulp will cling or adhere to the lead cathodes, especially when low current is carried, and from time to time these lead cathodes are emptied out through the plugged aperture through which they were inserted, and are melted down and the values recovered from them. The soft precipitate or oxid of the precious metals that flows from the shot cathodes into the filter tank, and that is not caught by the sacks, drops to the conical bottom of the tank, and accumulates there, and is drawn off from time to time through the valve 44' and is melted into bullion. Copper and other metals are also electrolytically recovered by my new electrolytic depositing system. If desired the solution can be run from the agitating tank into a separate tank, and be circulated through the revolving electrolytic- and metals-recovering filter, and back to the tank, continuously, as long as desired.

In Figs. 11 and 12, I illustrate a revoluble barrel precipitator 48, similar in construction to that shown in Figs. 1 and 2, but in which the anode and cathode are dispensed with, and the barrel is filled with a suitable precipitating medium such as zinc shavings, iron, or steel shavings, or scrap iron in any form, upon which the values are precipitated by chemical action alone. This barrel is constructed of material suited to the character of the solution employed, which may be either acid or alkaline. The barrel is supported either upon rollers 49, or on trunnions, and from one end a pipe or hose 50, leads to the solution tank 43, while from the other end, a pipe or hose 51 leads to a filter tank 52, similar to the tank 44. Upon the discharge end of the barrel, is secured a perforated plate 53, of suitable material, preferably clay, wood, or iron, and between this plate and the head 54, of the barrel, a chamber 55, is formed, into which the solution passes, and from which it flows to the filter tank through the pipe 51. The zinc shavings when employed, will catch the gold, as the solution passes through the barrel, and the scrap iron or iron shavings when employed, will catch the copper, and the gold or silver, that may be in the solution, and the solution will be practically free of gold, silver, and copper, after leaving the precipitator.

My invention enables me to recover a very large percentage of the gold and silver values of gold and silver bearing solutions not directly recovered in the agitating tank when used in connection with my agitator. It will also prove valuable in treating the cyanid solutions of the commonly used cyanid processes, where my agitator is not used, as by its use a very large and satisfactory recovery of the gold, silver, copper, and other metallic values of ores can be very speedily recovered, and in a form in which they can be easily reduced to their natural bullion. The friction of the rubbing and rolling of the shot on each other keeps them bright and clean and aids electrolytic action.

While my invention contemplates the use of any suitable cathode and anode material, and in any suitable form, and any arrangement it especially contemplates, I especially claim the use of shot for use for both cathodes and anodes, as they enable me to confine in a small device an enormous amount of anode and cathode surface. Furthermore, I do not wish to be limited to the construction and arrangement shown and described, as a number of other mechanical constructions could be used for operatively employing shot for anodes and cathodes in connection with a filtering medium without departing from the spirit of my invention. Thus, the anode could be arranged to surround the cathode, and be made in any desired manner.

Instead of shot, I may use mercury as the cathode in a construction substantially as shown in Figs. 1–4, the only modification required being the provision of end flanges of suitable depth to prevent escape of mercury from the central portion of the depositor, while still providing space for the free passage of the electrolyte. A modification of this character is illustrated in Fig. 13, wherein the flanges for retaining the mercury 39' are formed by an annular rim 27' constituting a portion of the spiders 27, 28.

Having described my invention, what I claim as new and desire to secure by Letters Patent, is:

1. In an electrolytic depositing apparatus, the combination with a tank provided with a supply of a chemical ore pulp solution, a pump connected to said tank, a revolving electrolytic depositing device connected to said pump, having an anode comprised of a suitable metal in a granulated or shot form, and a cathode comprised of a suitable metal in a granulated or shot form, and means including a pipe for conveying the solution from said filtering device to said tank, as specified.

2. In an electrolytic depositing apparatus, the combination with a tank, provided with a supply of chemical ore pulp solution, and the pump, of a revolving drum, having a filter in its inlet end, and a screen in both ends, an anode in said drum, and a cathode also in said drum, both operatively connected with a suitable current generator, as specified.

3. In an electrolytic depositing apparatus for chemical ore pulp solutions, a revolving drum having a solution inlet and outlet pipe, a filtering device at its solution entering end, and an electrolytical anode and cathode operatively positioned in said drum in the path of the solutions, and means for circulating ore pulp solutions through said drum, as specified.

4. In an electrolytical depositing apparatus, a chemical ore pulp solution filtering and precipitating device, comprising a revoluble drum provided with a solution inlet and outlet, and having a filtering medium adjacent to its solution inlet, and a cathode of lead shot operatively arranged in said device, and connected to a suitable current generator, as specified.

5. A filtering electrolytic precipitating device for chemical ore-pulp solutions, comprising a revolving drum, having a filtering medium at its inlet end, an anode comprising a body of shot, a cathode comprising a body of shot, said anode and cathode operatively connected to an electric current generator, and means for flowing ore-pulp solutions through said revolving drum, as specified.

6. An electrolytic precipitating device, comprising a revolving device, having an anode composed of a mass of shot or a granulated product or a perforated or corrugated or a solid of any suitable anode material, and a cathode comprising a mass of shot or granulated product of any suitable cathode material, said anode and cathode being operatively connected to a suitable electric current generator, as specified.

7. An electrolytic precipitating device for chemical ore pulp solutions, comprising a device provided with a cathode comprising a mass of lead shot, and a suitable anode, said anode and cathode being electrolytically connected to an electric current generator, as specified.

8. An electrolytic precipitating revolving cell, for chemical ore pulp solutions, comprising a revoluble drum or barrel having a solution inlet and outlet, a filter adjacent to said solution inlet adapted to arrest the finely pulverized ore in the solution, a cathode comprising a body of lead shot, and an anode comprising a body of lead shot, a suitable electric current generator, and suitable electrical connections between said generator and said lead shot cathode and anode, as specified.

9. A depositing electrolytic device, comprising a rotating casing, containing a rotating filtering medium, and a rotating anode and cathode composed of any suitable metal or material in granulated or shot form electrically connected to a suitable electric current generator, as specified.

10. A depositing electrolytic device, comprising a revolving casing, an anode in said casing composed of any suitable material in the form of shot fine enough to provide a multiplicity of anode surfaces, said shot anodes being incased in a filtering medium, a cathode in said casing composed of any suitable material adapted to permit the ready detachment of solid matter accumulating thereon, and in the form of shot fine enough to provide great multiplicity of cathode surfaces, and arranged to frictionally rub and roll on one another as said casing rotates, said anode and cathode being operatively connected to a suitable electric current generator.

11. A depositing electrolytic device for recovering the metallic values of cyanid ore pulp solutions, comprising a rotating casing, a filtering medium, a cathode in a subdivided, granulated, or shot form containing lead of a quality adapted to permit the ready deposition of the metals thereon, and arranged to roll and rub together as said casing rotates, an anode at the center of said casing within said lead shot cathode, composed of shot, a filtering envelop surrounding said lead shot anode, said anode shot being arranged to roll and rub on each other as said anode rotates with said casing, a screen at each end portion of said casing, arranged to retain said cathode shot around said anode, suitable electrical commutator rings on said casing, circuit wires connected to said anode and cathode and to said commutator rings, commutator brushes arranged in operative relation to said commutator rings, and operatively connected to an electric current generator, as specified.

12. In an electrolytic device for recovering the precious metals from cyanid and other chemical ore pulp solutions, the combination with the agitating tank and a pump operatively connected thereto, of a revoluble casing having a filtering medium at its inlet end and having an operative anode and cathode therein, and connected to said pump, and a fixed tank connected to said revoluble casing at its lower end, and with said agitating tank at its top end, a filtering medium in said tank intermediate of its ends, and a valved discharge aperture in its lower end, as specified.

13. A metallurgical apparatus comprising in combination a dissolving vessel, a precipitating cell mounted for rotation, a filter, and means for conveying a liquid between said vessel, cell and filter.

14. A metallurgical apparatus comprising in combination a dissolving vessel, an electrolytic precipitating cell having a permeable electrode, a filter, and means for conveying a liquid between said vessel, cell and filter.

15. A metallurgical apparatus comprising in combination a dissolving tank, an electrolytic precipitating cell having a permeable electrode consisting of detached metallic particles, a filter, and means for conveying a liquid between said tank, cell and filter.

16. A revolving filtering precipitating cell, comprising a cylindrical casing, a filtering medium in said cell, an electrode in the axial center of said cylindrical casing, composed of a cylinder of lead or other suitable material, an electric current wire connected at one end to said electrode, a cylindrical layer of shot surrounding said cylindical electrode, and a filtering medium surrounding said shot, with a circumferential layer of lead shot surrounding said electrode and filling said cylindrical casing, an electric circuit connected to said lead cathode, and a suitable electric circuit generator operatively connected to the circuit wires of said cathode and anode, and means for circulating cyanid or other chemical ore-pulp solutions through said cell, and for collecting the deposit detached from said cathode.

17. In an electrolytic depositing apparatus for cyanid and other chemical ore pulp solutions, the combination of a solution holding tank, a revolving filtering electrolytic cell having an anode in granulated or shot form, and a cathode in granulated or shot form surrounding said anode, means for electrolytically connecting said anode and cathode operatively together, and means for circulating solutions from said tank through said revolving filtering electrolytic cell.

18. In an electrolytic depositing apparatus, the combination of the solution holding and agitating tank, provided with electrolytic electrodes, the revolving filtering electrolytic cell, the stationary filtering tank, and the pump and piping arranged to circulate solutions from said solution holding and agitating tank through said revolving cell and stationary tank back to said solution holding and agitating tank.

19. An electro-precipitating and ore-pulp solution circulating apparatus for cyanid and other chemical ore-pulp solutions, comprising a movable anode and cathode, constructed to permit circulation of the electrolyte operatively connected together electrolytically, and to a suitable supply of electric current, a supply of cyanid or other chemical ore pulp solutions, and means for circulating said solutions through said movable anode and cathode.

20. A cyanid and other chemical ore pulp solution filtering and electro precipitating apparatus for recovering the precious metals from ores, which consists of a movable filtering medium, a movable anode and cathode operatively connected in electrolytic relation and constructed to permit circulation of the electrolyte, a stationary filtering medium, a supply of cyanid or other chemical ore pulp solutions, and means for circulating said solutions through said movable filter and anode and cathode, and said stationary filter, as specified.

In testimony whereof I affix my signature in presence of two witnesses.

WILBUR ALSON HENDRYX.

Witnesses:
G. SARGENT ELLIOTT,
THEODORA WELLS.